Feb. 7, 1967  L. E. DE NEERGAARD  3,303,487
METHOD AND APPARATUS FOR MEASURING DISPLACEMENTS
Filed June 29, 1964  5 Sheets-Sheet 1

Feb. 7, 1967 L. E. DE NEERGAARD 3,303,487
METHOD AND APPARATUS FOR MEASURING DISPLACEMENTS
Filed June 29, 1964 5 Sheets-Sheet 3

INVENTOR.
*Leif Eric de Neergaard*
BY
*Parker & Carter*
*Attorneys*

United States Patent Office 3,303,487
Patented Feb. 7, 1967

3,303,487
METHOD AND APPARATUS FOR
MEASURING DISPLACEMENTS
Leif Eric De Neergaard, deceased, late of Madison, Wis., by Leo J. Mueller, executor, Chicago, Ill., assignor to Hans W. Trechsel, Wayzata, Minn., Deryck A. Gerard, Minneapolis, Minn., and Norman S. Parker, Evanston, Ill.
Filed June 29, 1964, Ser. No. 379,041
26 Claims. (Cl. 340—195)

This is a continuation-in-part of application Serial No. 137,159, filed January 6, 1950, now forfeited and application Serial No. 527,719, filed August 11, 1955, now abandoned, and a continuation-in-part of application Serial No. 726,997, filed April 7, 1958, now abandoned.

This invention relates to measuring apparatus, and is more particularly illustrated in connection with apparatus for measuring linear displacements such as the length, width, thickness, depth, diameter and similar measurements of articles of manufacture as they are being machined, fabricated or inspected.

A lead-screw with a highly accurate thread generated along its length, operating in conjunction with a precision machined coacting nut, is frequently used in machine tools such as lathes, grinders, milling machines and similar fabricating machines to simultaneously control and measure the dsplacements of work-to-tool or tool-to-work members while an article of manufacture is being processed. Smaller screws also with coacting nuts are also used as the basic measuring elements in the well-known micrometer extensively used in gauging dimensions of work either in process or in final inspection. Since the internal thread of the nut is in actual physical contact with the thread of the lead-screw, it is apparent that this metal-to-metal contact will induce friction and therefore wear between these elements, and since the accuracy of a lead-screw and its coacting nut is dependent upon the integrity of their dimensions, it is apparent that, due to this wear, their value in accurately measuring linear displacements or dimensions diminishes as these elements are used. This wear is most pronounced in situations where rotation of the lead screw is not only used for measuring linear displacements but also as the means for advancing tool-to-work or work-to-tool members. Thus, a lead-screw controlling the movement of the slide of a lathe, for example, loses its high degree of accuracy in a short time due to wear of the lead-screw and coacting nut caused by the resistance of the cutting tool as it is forced into the stock being machined.

Scales equipped with vernier attachments are also commonly used in measuring linear displacements of carriages, slides, and similar tool-to-work or work-to-tool members of machine tools, as well as in bench inspection. Such measuring devices entail the use of considerable skill in making accurate readings even when a high powered magnifying glass is used, and cannot, as a rule, be read with accuracies of greater than plus or minus one or two ten-thousandths of an inch, and inasmuch as the human element is a great factor in making close vernier readings, it is often possible for two skilled machinists to identify the same reading differently.

Dial gauges are frequently used in inspection work to measure very small linear displacements, although their total range of operation is generally in the order of but one or two hundredths of an inch. Such a gauge uses a delicate mechanism to mechanically magnify movement between the gauge button and the indicating pointer. These gauges soon lose their accuracy, while rough handling or an accidental blow will often completely destroy their utility.

Sets of gauge blocks of various lengths, made of specially selected and aged steel, and finished to such close tolerances as two or three millionths of an inch in the dimension between their parallel faces, are extensively used in tool rooms for inspection and layout work requiring high limits of accuracy. In use, blocks of various known lengths are stacked or "wrung" together until the overall length of the stack equals the desired measurement. These gauge blocks although highly accurate under certain conditions of use are extremely expensive. Not only does this factor limit their use in ordinary inspection and layout, but the excessive time used in selecting the proper gauge blocks and "wringing" them together makes their use for many operations entirely impractical.

Another shortcoming of gauge blocks is that after use for a considerable length of time the blocks wear due to rubbing action when they are "wrung" together with an attendant reduction in their accuracies.

An important object of this invention is an apparatus for making linear measurements in which there is absolutely no physical contact between the measuring elements. Thus, the accuracy of the device is absolutely unimpaired with use.

Another important object is a measuring apparatus whose visual indicating means can be remotely located from the point where the measurement is being made. Thus, the indicating means can be placed at any desired location on a machine tool where it can be most efficiently read by the operator.

Yet another important object is methods and means by whose use measuring apparatus can be constructed which is capable of instantaneously and continuously indicating linear displacements within the range of the device in units, tenths, hundredths, thousandths and ten thousandths of an inch, or in sub-divisions of other units of measurement, such as the meter.

A further object is an apparatus for accurately measuring linear displacements of considerable magnitude. Thus, as an example, a measuring device can be constructed which is capable of continuously measuring and visually indicating in units, tenths, hundredths, thousandths and ten thousandths of an inch any linear displacement of a lathe carriage along the length of a lathe bed which, in some instances, may measure hundreds of inches in length.

Another object is a system for measuring and continuously indicating linear displacements in which any displacement in one direction of a measuring element along the length of a meter bar causes an indicator to instantly and automatically present a visual reading which is increased in precise proportion to the magnitude of the additional linear displacement, while opposite displacement of the measuring element causes an instant change in the indicated reading proportional to the reverse or negative displacement being measured.

Another object is a highly accurate apparatus for measuring and visually indicating linear displacements in which but three moving elements are used in a device of the simplest form.

Another object is an apparatus for measuring and indicating linear displacements whose measuring elements are at no time compressed, or otherwise stressed while the device is being used.

Another object is an apparatus for measuring linear displacements in which any displacements of a measuring element in a certain direction along the length of a meter bar can, at the will of the operator, be made to cause either additive or subtractive registration at the visual indicating instrument.

Another object is a system for measuring and indicating linear displacements in which a species of dual alternator is used to simultaneously generate a reference alternating current and a variable phase alternating current in such a manner that the phase relationship of one alternating current to the other is absolutely independent of the rate of rotation of the rotor of the dual alternator from instant to instant.

Another object is a dual alternator which simultaneously generates a plurality of separate alternating currents, the phase relationship of which is unaffected by any hunting of the rotor.

Another object is a species of alternator which simultaneously generates a plurality of alternating currents whose phase relationships are totally unaffected by movement of the rotor shaft parallel to its axis.

Another object is a measuring system with a single series of spaced flux areas on an elongated signal generating element, provides signals of different frequencies with one frequency being a constant multiple of the other.

Another object is a mechanism which may present a reading of a distance being measured in terms of inches and fractions of inches.

Another object is a novel system for counting the number of flux areas that move past a scanning assembly.

Other important objects will appear from time to time in the ensuing specification and drawings, in which.

Figures 1, 2, 3:
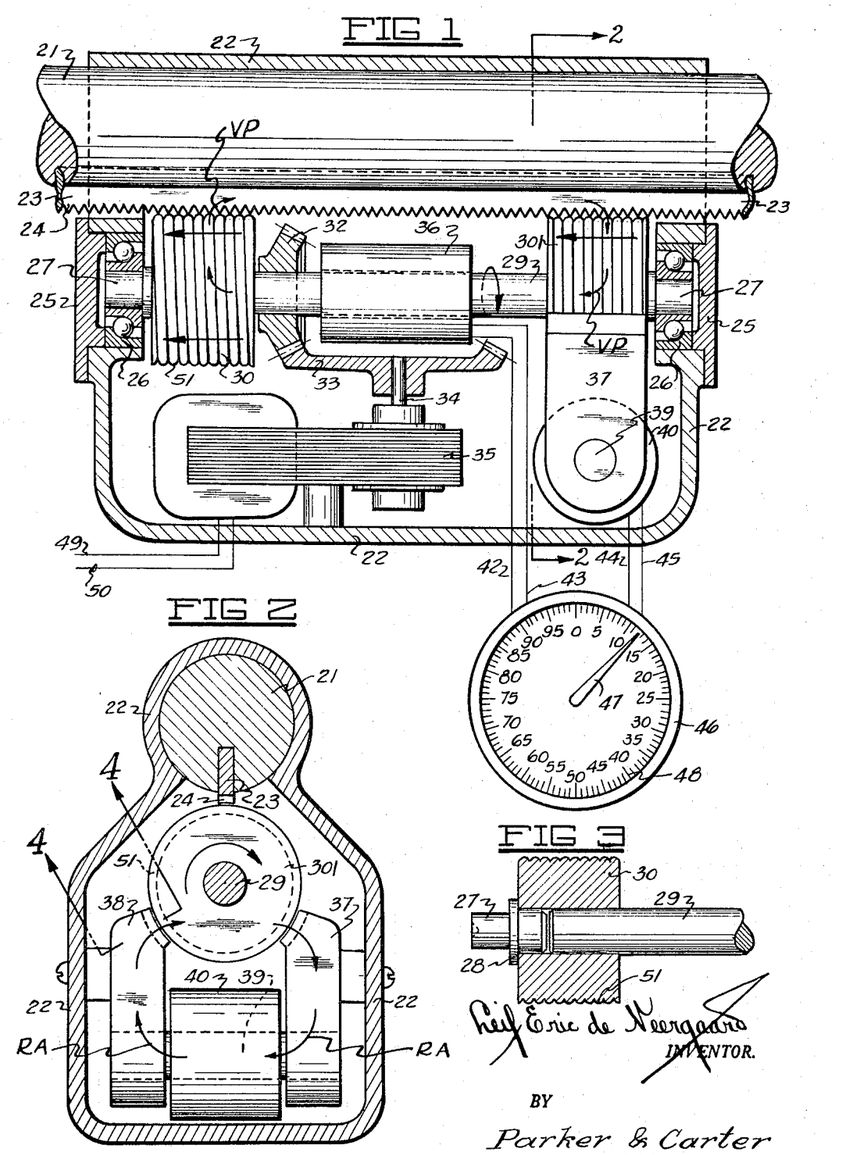
FIGURE 1 is a fragmentary view, in a vertical plane section, through a measuring apparatus according to this invention.
FIGURE 2 is a vertical cross section taken on the line 2—2 of FIGURE 1.
FIGURE 3 is a detail in cross section through a flux interrupting element illustrated in FIGURES 1 and 2.

Referring first to the form shown in FIGURE 1, a case or housing 22, preferably of steel, encloses two separate alternators and their attendant drive. A small motor 35 drives bevel gear 33 which is mounted integral to the motor shaft 34. A bevel pinion 32 meshes with the gear 33 and is integral to a rotor assembly comprised of a rotor shaft 29, two similar rotors 30 and 301, and two identical stub shafts 27. The gears 33 and 32 may have any suitable ratio to produce the desired rotative speed of the rotor assembly. The rotor shaft 29 is made of "Alnico," cobalt steel, or other high grade permanent magnet material. The identical rotors 30 and 301, which are made of pure iron or any material having low reluctance and magnetic retentivity are pressed on the ends of rotor shaft 29, and, as shown in FIGURE 3, the two stub shafts 27, made of bronze, brass or similar paramagnetic material, are pressed into the bores of rotors 30 and 301 until the shoulders 28 of the stub shafts bear against the end faces of the rotors. The rotor assembly is mounted in two precision type ball bearings 26 whose outer races are supported by the alternator case 22, and two similar end caps 25 lock the outer races of the bearings 26 so that axial movement of the rotor assembly is held to a minimum.

A single thread 51, preferably of folded sine wave form, is generated along the lengths of the circumferential surfaces of the rotors 30 and 301 after their final assembly to the rotor shaft 29. The thread of rotor 301 is an exact continuation of the identical thread on rotor 30. For purposes of description it will be assumed the pitch of thread 51 is precisely .100". The lengths of rotors 30 and 301 are multiples of this pitch.

The bore of a semi-cylindrical section integral to the case 22 is machined to afford a smooth surface which is slidably supported by the meter bar 21. The meter bar is preferably circular in cross section and may be of any desired length, and a rack 23, made of pure iron or material similar to that used in the rotors 30 and 301, is integrally fastened to the meter bar.

A permanent magnet 39, cylindrical in form, integrally mounts pole pieces 37 and 38 which are pressed on the opposite ends thereof. The pole pieces are made of ferromagnetic material similar to that used in the rotors 30 and 301 and the rack 23. The pole faces of these pole pieces 37 and 38 may be considered segments of a cylindrical sleeve which is internally threaded, at 52 in FIGURE 4 for pole 38, and cooperate with rotor 301. The inside diameter of this internal thread 52 is, for example, .002" larger than the outside diameter of thread 51 on rotor 301 while the hand and pitch of thread 52 is identical to thread 51 of rotor 301. An induction coil 40, consisting of many turns of fine insulated copper wire, surrounds the magnet 39. The magnetic circuit of the reference alternator is indicated in FIGURE 2 by the arrows RA shown thereon.

Figure 4:
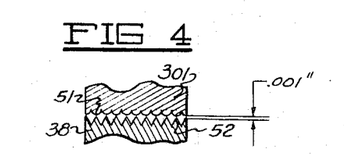
FIGURE 4 is a detail in cross section on the line 4—4 of FIGURE 2, showing two of the flux interrupting elements.

The assembly consisting of magnet 39, induction coil 40 and pole pieces 37 and 38 are rigidly fastened to the alternator case 22 in such a manner that a small clearance is maintained between the peaks of the internal threads 52 of the pole pieces and the crests (hereinafter used to define the highest points of the crowns of the folded sine wave form thread 51) of the thread 51 of rotor 301. In addition these peaks and crests are in exact alignment or register, as shown in FIGURE 4.

For purposes of description it will be assumed the rotor assembly is continuously rotated in a clockwise direction, as seen in FIGURE 2, at an angular velocity of exactly 100 r.p.s. when the motor 35 is energized with current led to its windings through conductors 49 and 50, FIGURE 1. The threads 51 of rotor 301, and of rotor 30, will therefore be linearly displaced at the rate of one hundred threads per second. The rotation of the pitches of thread 51 causes the magnetic flux flowing in the magnetic circuit of the reference alternator to rise from minimum to maximum and back to minimum magnitude one hundred ties per second, it being understood that maximum flux will flow in the circuit at the instants the crests of thread 51 are in exact alignment with the peaks 52 of the pitches of internal thread 52 on both pole pieces 37 and 38 and that minimum magnetic flux will flow when the peaks of thread 52 are midway between the crests of adjacent pitches of thread 51. The utilization of the E.M.F. produced in coil 40 will be explained.

Figure 5:
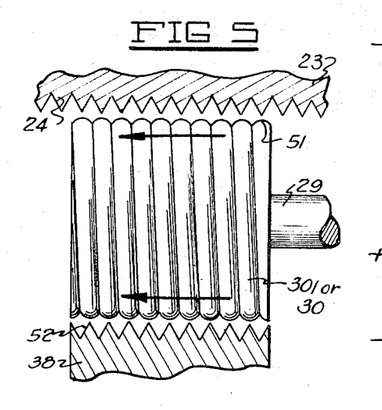
FIGURE 5 illustrates on an enlarged scale the relative positioning of certain flux interrupting elements.
Figure 6:
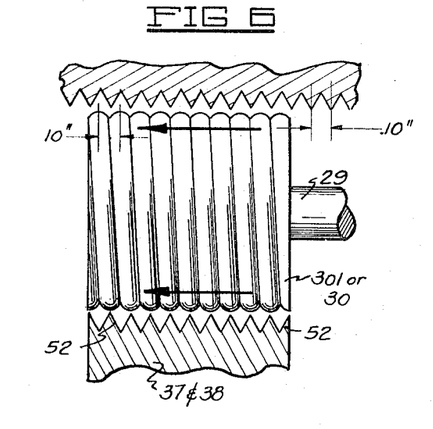
FIGURE 6 is another illustration of the elements illustrated in FIGURE 5, in different position.

The variable phase alternator, hereinafter alluded to as the V.P. alternator, is comprised of the rotor assembly, rack 23 integral to the meter bar 21, and the induction coil 36. Very accurately generated teeth 24 are cut or ground along the length of the rack 23. The pitch of these teeth, in the example being used, is exactly .100", and is therefore identical to the pitch of threads 51 and 52 already described. The teeth are brought to sharp peaks or wedge-like points as illustrated in FIGURES 5 and 6. The distance between the parallel axes of the rotor assembly and the meter bar 21 is such that a small clearance is provided between the crests of the threads 51 of the rotors 30 and 301 and the peaks of teeth 24 at the instants when they are in exact register with one another. The induction coil 36 on shaft 29, is similar in construction to the coil 40 of the reference alternator. The magnetic circuit of the V.P. alternator is indicated by the arrows V.P. drawn on FIGURE 1, while the direction in which the crests of thread 51 are continuously linearally displaced is represented by the arrows on the rotors 30 and 301.

As in the case of the operation of the reference alternator already described the magnitude of the magnetic flux threading the magnetic circuit of the V.P. alternator is controlled from instant to instant by the length of the air gap separating the crests of threads 51 and the peaks of teeth 24 of the rack 23. Thus, when the crests of threads 51 of the rotors 30 and 301 are simultaneously in exact register with the peaks of teeth 24, the air gaps through which the flux must flow from rotor 30 to rack 23, then to rotor 301, will be, for example, at a minimum, while rotation of the rotor assembly through an angle of 180° will cause the air gaps separating the crests and peaks of thread 51 and teeth 24 respectively to be increased to their maximum lengths.

Figure 7:
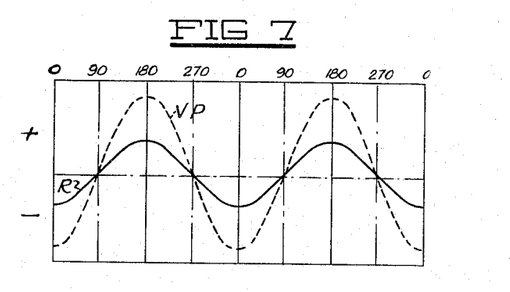
FIGURE 7 is a graph portraying a certain phase relationship of two alternating currents generated by the apparatus in FIGURE 1, when in the position in FIGURE 5.

FIGURE 5 schematically illustrates the crests of threads 51 of the rotors 30 and 301 simultaneously in exact register with the peaks of the threads 52 of the reference alternator's pole pieces and of the peaks of the teeth 24 of the rack 23 which, as stated, is also part of the magnetic circuit of the V.P. alternator. Therefore, the magnetic flux separately threading the two magnetic circuits of the reference and V.P. alternators will both be maximum and the alternating E.M.F. output of induction coil 36 of the V.P. alternator wil be displaced in relation to the alternating E.M.F. output of induction coil 40 of the reference alternator by zero degrees since the magnitudes of the two electromotive forces vary in exact unison, as indicated in the graph FIGURE 7, in which the reference E.M.F. is shown in solid outline and the output of the V.P. alternator is represented in dotted profile.

Figure 8:
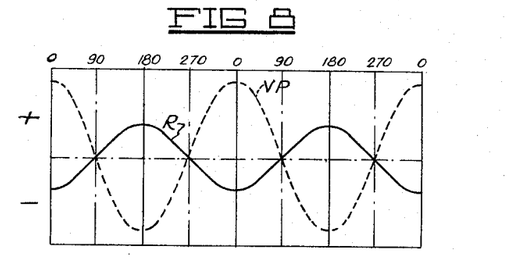
FIGURE 8 is a second graph, similar to FIGURE 7, but illustrating a different phase relationship of the same two alternating currents with the parts in the position in FIGURE 6.
Figure 9:
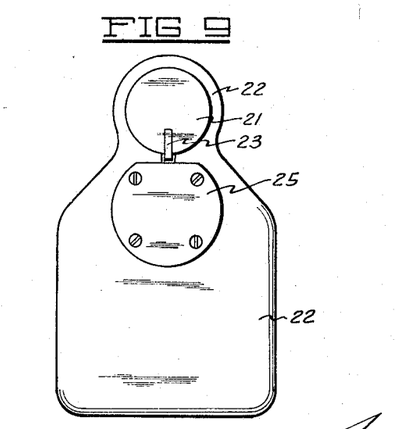
FIGURE 9 is an elevation of one end of the case which is used in conjunction with the apparatus illustrated in FIGURES 1 and 2.

FIGURE 6 illustrates that the meter bar 21 and rack 23 have been lineally displaced a distance of exactly one-half of a thread pitch or .0500" from the position it occupied in FIGURE 5, but the peaks of threads 52 remain in exact register with the crests of threads 51, as they were in FIGURE 5. Since the peaks of teeth 24 of rack 23 are at this instant in exact register with the valleys separating adjacent convolutions of thread 51, then, as graphically indicated in FIGURE 8, the alternating E.M.F. output of the V.P. alternator is displaced or out of phase with the reference E.M.F. by one-half an electrical cycle or exactly 180 electrical degrees.

The output of the reference alternator induction coil 40 may be led to the case of a polyphase phase angle meter 46 (FIGURE 1) through conductors 44 and 45. This output is fed to a phase splitting network (not shown) used to separately supply the two stator windings of the meter 46 with two alternating currents which are 90° out of phase in relation to one another. The output of the V.P. alternator induction coil 36 is impressed on the rotor winding of the meter 46 by the two leads 42 and 43. The pointer 47 of this meter is caused to pass through exactly one revolution in one direction when the alternating E.M.F. output of the V.P. alternator is displaced 360 electrical degrees in a lagging direction in relation to the reference alternating E.M.F., while the pointer is caused to rotate through 360 degrees in the opposite direction if the alternating E.M.F. of the V.P. alternator leads the reference E.M.F. by 360 electrical degrees.

Since it is desired to directly and instantly read the magnitude of any linear displacement of the meter bar 21 in relation to the alternator case 22 by the position of the pointer 47, the circumferential area of the dial of the meter 46 may, for purposes of illustration, be divided into one hundred spaces by means of graduations 48 on the dial as shown in FIGURE 1.

Any linear displacement of the meter bar 21 in the direction of the displacement of the crests of thread 51 to the left, as indicated by the arrows on the rotors 30 and 301 FIGURE 1, causes a lagging displacement of the output E.M.F. of the V.P. alternator in relation to that of the reference alternator. With proper connections to the phase angle meter 46, its pointer 47 can be made to rotate in a clockwise direction when the V.P. E.M.F. is so displaced in a lagging direction; while with the same electrical connection on opposite or leading displacement of the V.P. alternator's alternating E.M.F. in relation to the reference signal will produce a counter-clockwise rotation of the pointer 47. Thus the pointer will rotate in a clockwise direction through exactly 360° if the meter bar 21 is displaced in a direction from right to left, as viewed in FIGURE 1, a distance of precisely .100". Upon displacement of the meter bar in the same direction a distance of .010" the pointer 47 will revolve in a clockwise direction through an angle of 36° while a meter bar displacement of .001" in the same direction will cause clockwise rotation of pointer 47 through 3.6 degrees. Since each division between adjacent graduations measures 3.6 degrees the pointer 47 will move a distance equal to one division for each .001" displacement of the meter bar relative to the alternator case 22.

Figure 10:
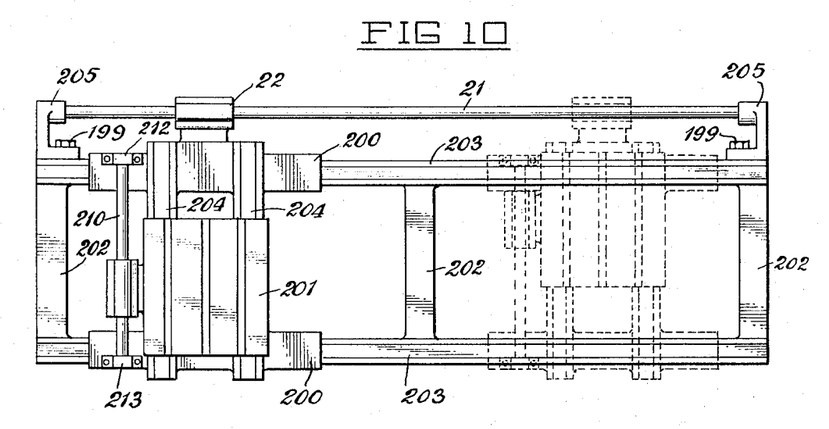
FIGURE 10 is a plan view of a machine tool and certain measuring elements of the system constituting the invention.

The application of the measuring system to a machine tool is schematically shown in FIGURE 10 which illustrates in plan, certain elements of a machine tool which may be essentials of a lathe, grinder, router, milling machine, jig borer or similar fabricating machine. It will, for purposes of description, be considered to illustrate the bed, carriage and slide of a lathe. For the purpose of clarity, the head and tail stock have been omitted. For the same reason the illustration of lead screws, hydraulic or pneumatic cylinders, racks or other devices used to impart linear displacement to slidable machine tool members have also been omitted from this figure.

Two spaced parallel ways 203, FIGURE 10, are provided on which carriage 200 is slidably supported. Ribs 202 separate ways 203, as shown. Two spaced parallel ways 204 are provided on carraige 200 which slidably support slide 201 upon which a tool post (not shown) would be normally fastened. The axes of ways 204 are transverse to ways 203 as shown. Two suitable metal brackets 205 and 206 are fastened integral to the bed of the lathe by means of bolts 199. These brackets rigidly support a horizontally extending meter bar 21 in exact parallelism to ways 203. The housing 22 of a measuring head is rigidly fastened to carriage 200 in such a manner that it can freely slide along the length of meter bar 21 with minimum friction in response to any movements of the carriage along ways 203. Two similar brackets 212, 213, fastened to the carriage by screws support a second meter bar 210 in precise parallelism to ways 204 provided on the carriage. A second measuring head is rigidly fastened to slide 201 as shown.

Illustration of electrical connections and circuits have been purposely omitted from FIGURE 10. However, it will be understood that the two meter bars and two measuring heads shown in this figure operate in conjunction with electronic equipment similar to those described. Two separate scales (not shown), one extending parallel to meter bar 21, the other parallel to meter bar 210, FIGURE 10, and graduated in inches may operate in conjunction with two suitable pointers (one affixed to carriage 200, the other to slide 201) would enable the displacements of the carriage and slide to be indicated in units of one inch, while the indicators controlled by the two measuring heads would visually indicate the magnitude of the displacements to within .001".

An oscilloscope can also under certain conditions be used to not only translate variable phase relationships (existing between alternating currents which are proportional to linear displacements) into visual indications of the magnitude of longitudinal displacements, but it can also be utilized to graph said magnitudes on a chart for permanent recording.

It will be understood that the systems hereindescribed can be adapted to measure linear displacements in units of linear measurement of the metric system (or any other system) if desired. In that case, the pitch of the spiral flux interrupting members and the pitch of flux transmissive, non-transmissive elements arranged along the length of the meter bar would be, for instance, 1 centimeter, or 1 millimeter, etc.

In the production of meter bars and their co-acting rotary flux interrupters, it will be found that errors in the spacing, profiles or outlines of alternate flux conductive and non-conductive elements impressed thereon can be reduced almost to the vanishing point by causing a large number of rotated, flux conducting spiral convolutions to cooperate simultaneously with a similar number of alternate flux conductive and non-conductive elements arranged along the length of a meter bar to effect modulation of the flux. Any very slight error in the pitch of one of the convolutions or channels will be reduced by the averaging effect of the other perfect pitches. It has been found that the optimum number of spiral convolutions cooperating at any instant with a similar number of spaced teeth is at least ten. This method of minimizing errors in the spacing of the flux interrupting elements provided on the meter bar and rotary member is of very great importance.

As illustrated and described, a clearance of some .002" or .003" may be provided between the rotary flux interrupters, rotors 30 and 301, FIGURES 1 to 6, and their coacting meter bars. Since there is no physical contact between these elements which constitutes the measuring elements per se, it will be seen that no wear can ever take place in these elements to affect the accuracies of the systems herein disclosed.

Since the positioning of the various types of indicating means of the systems herein described and illustrated is controlled by the phase of one alternating current in relation to one or more other alternating currents, it is manifest that the indicating instruments can be situated a great distance from the measuring units if desired, and also that more than one indicating instrument can be provided at separated points to visually indicate the same linear displacements. This is of great importance since the indicating means can be positioned at any point on, or external to, a machine tool where it may be most conveniently read.

Although not illustrated, it should be understood that the leads between coils 36 and 40 and meter 46 should be shielded and as short as possible to reduce extraneous pickup to the minimum.

FIGURES 11 through 15 represent another embodiment of the invention. In this embodiment, an elongated magnetic storage member 100 or meter ribbon has a plurality of series of magnetic flux transmissive areas thereon. The first series is designated generally at 102, the second series at 104, and the third series at 106. Scanners 108, 110 and 112 are respectively associated with each of these series and are positioned immediately above the member 100. The scanners 108, 110 and 112 are all formed by a helical screw shown most clearly in FIGURE 12 and are all mounted on a common shaft 114 driven by a motor 116. In this embodiment of the invention, a plurality of alternate magnetic flux transmissive or emissive and non-magnetic flux transmissive or emissive areas are provided in each series. The flux transmissive areas may be assumed to be longitudinally recorded, that is, with theoretical north and south poles spaced longitudinally of the member 100. The pitch P of the threads of the scanners is equal to the pitch of the magnetic areas. The scanners 108, 110 and 112 may be formed of Mumetal or other similar material having a relatively high permeability to low flux density.

Figure 13:
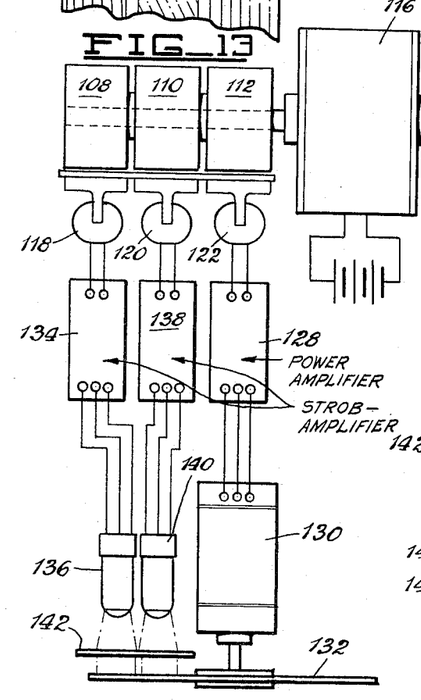
FIGURE 13 is a diagrammatic view of the embodiment shown in FIGURES 11 and 12.
Figure 14:
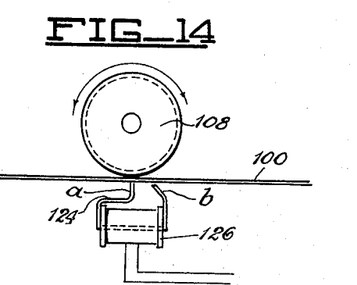
FIGURE 14 is a detail view of certain elements shown in FIGURES 11, 12 and 13.
Figure 15:
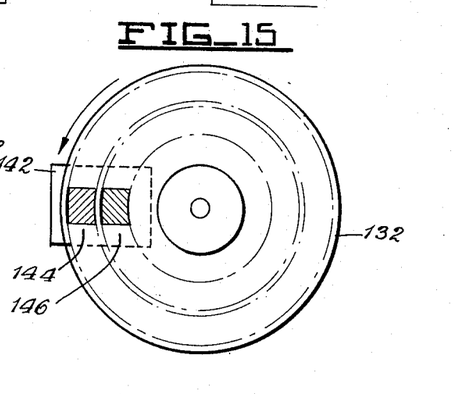
FIGURE 15 illustrates one indicating instrumentality which may be used with the embodiment of FIGURES 11 through 14.

As will be seen most clearly in FIGURE 13, pickup coil structures 118, 120 and 122 are positioned beneath the member 100. Each of these pickup coils is associated with one of the scanners 108, 110 and 112 respectively and may be identically formed. Each includes, for example (as will be clear in FIGURE 14), a magnetic loop formed of Mumetal 124 passing through an induction coil 126. The legs of the loops are spaced longitudinally of the member 100 and one leg $a$ is positioned beneath the axis of the scanning screw associated therewith, which in this instance will be taken to be the scanner 108. The other leg $b$ is spaced from the leg $a$ although beneath the scanner. Thus a magnetic flux path is established between the magnetized areas, scanner, loop and induction coil. If the screw is rotated at a predetermined rate, say for example, 60 revolutions per second, the threads of the screw will move across the magnetized areas at the rate of 60 areas per second. The threads of the scanner 108 which form equally spaced flux transmissive elements may be assumed to shunt or divert flux from the magnetized areas on the member 100. The maximum shunting effect may be attained when the threads 128 of the scanner are directly above the magnetized areas and the least shunting effect when the threads are between adjacent magnetic flux transmission areas. Movement of the threads with respect to the areas varies the flux in the loop 124. Thus during rotation of the scanner 108, the scanner will modulate the flux and cause a signal of varying amplitude to be induced in the coil 126. If the scanner is rotated at the rate of 60 revolutions per second, the scanner will modulate the flux at 60 times per second with the result that a 60 cycle per second signal is induced in the coil 126.

In this embodiment, the series 106 extend generally parallel to the longitudinal axis of the member 100. Thus the signal generated in the coil 122 will have a frequency corresponding to the rate of rotation of the motor 116. This signal is amplified at 128 and fed to a synchronous motor 130. The synchronous motor 130 rotates an indicating disc 132 and each of the portions of the indicating disc 132 may carry calibrations spaced in circles about the axis of the disc. Thus the motor 116 may be a direct current motor and have a varying speed of rotation and the indicating disc 132 will have a rotational speed corresponding to the speed of the motor 116 and the scanning rate.

The two series of flux conductors 102 and 104 are given predetermined slopes with respect to the axis of the member 100. The series 104, for example, may have a slope corresponding to one pitch P for every 1/10th inch length. The series 102, may have a slope equal to one pitch P for every one inch of length. Relatively bodily movement between the scanners and the member 100 in a direction parallel to the length of the member 100 (which results in relative movement between the areas and scanner) brings about a predetermined phase change in the signal generated. The signal from the coil structure 118 may be amplified as at 134 and employed to fire a stroboscopic light source 136. The signal from the coil structure 120 may be amplified as at 138 and fed to a stroboscopic light source 140. The light from these two sources 136 and 140 may pass through a shield 142 and illuminate scales 144 and 146 on the disc member 132. Scale 144 may be calibrated in tenths of an inch and the scale 146 may be calibrated in hundredths and thousandths of inches.

It should be noted that the effect of driving the synchronous motor 130 from the scanning action of the scanner 112 has the effect of rotating this motor at precisely the same speed of rotation as the same speed of rotation of the scanner. In effect the D.C. motor 116 and synchronous motor 130 are on a common shaft. Furthermore, the series of spaced magnetic flux transmissive areas 106 could, under some circumstances, be dispensed with and the D.C. motor could be arranged to drive the disc 132 in lieu of the motor 130. Furthermore, a precisely and constant speed is unnecessary in the system. An air motor could be used to rotate the scanners and the indicating disc 132 as long as the speed of rotation is generally the same. If an air motor was used, the speed of rotation would vary considerably but the system could still operate since the base frequency generated from the scanners 108 and 110 would correspond to the speed of rotation. The scanner is driven by a synchronous motor at a predetermined speed, say, for example, 60 revolutions per second. This has the effect of alternately increasing and diminishing the amount of magnetic flux passing through the pickup coils at the scanning rate or 60 times per second. Thus the coil will transmit a signal having a frequency corresponding to the scanning rate or 60 cycles per second.

If the meter bar 100 and the scanner are moved bodily relative to one another in a direction parallel to the length of the bar while the scanning action is taking place, a phase shift in the signal results. For example, if the member 100 is moved in one direction a distance equal to one pitch during one second of time, the resultant frequency will be 59 cycles per second. If the member 100 is moved in the other direction, the resultant frequency will be 61 cycles per second. In other words, relative movement equal to one pitch is equal to a 360 degree phase change in the signal generated.

I wish it to be understood that the relative movement need not occur in any given period of time. It may take place gradually or quickly. I have mentioned the relative movement as occurring in one second of time for purposes of description. Furthermore, any relative movement less than that stated brings about a proportionally smaller phase change in the signal generated. The signal transmitted by the coils is amplified and converted to a pulse and is supplied to the stroboscopic light source. Since the signal supplied to the stroboscopic light source has the same frequency as the scanning rate during such times that the scanner and meter ribbon are stationary relative to one another, the light source will optically stop the disc and illuminate the same portion of the disc at a frequency corresponding to the frequency generated. However, when the stroboscopic light source undergoes a phase change which results from the aforementioned bodily relative movement, it will fire at a different time and thus illuminate a different portion of the indicating disc. This gives a different reading.

Figures 16, 17:
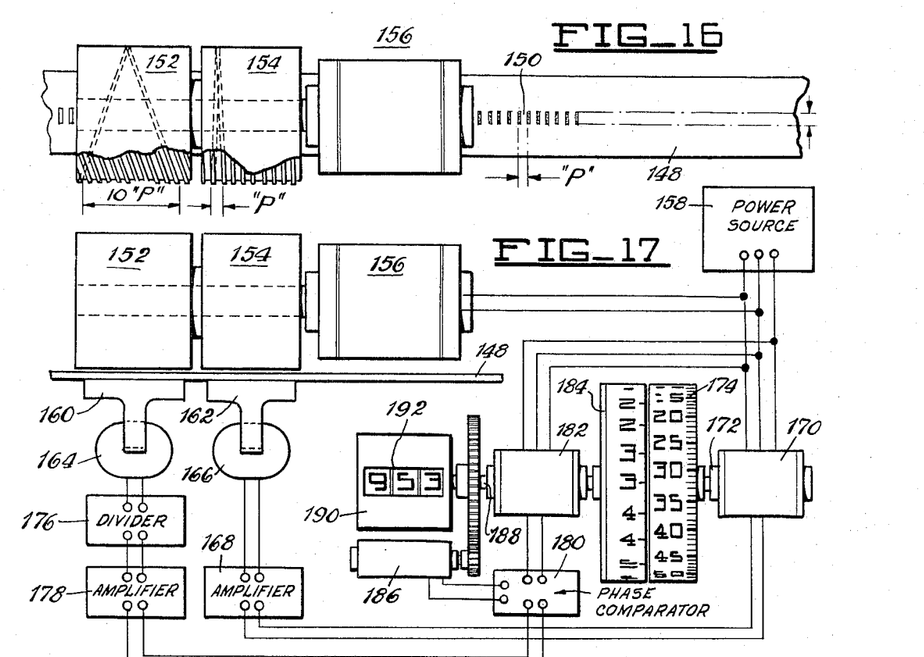
FIGURE 16 is a plan view of another embodiment of the invention.
FIGURE 17 is a diagrammatic layout view of a measuring system employing the embodiment illustrated in FIGURE 16.

FIGURES 16 and 17, illustrate another embodiment of the invention. In this embodiment, magnetic flux emissive spaced areas are employed along the length of a meter ribbon 148. The series of magnetic flux transmissive areas are, in this embodiment, formed as areas 150 which are spaced along the length of the meter bar 148. These areas are spaced apart at a pitch P corresponding to a predetermined unit of linear measurement, say, for example, 1/10th of an inch. In this embodiment, the individual magnetized areas 150 may be assumed to have theoretical north and south poles spaced transversely of the record and the areas between the areas may be assumed to have no polarity or a different polarity. In this embodiment, scanners 152 and 154 are driven by a synchronous motor 156. The motor 156 receives electrical energy from a single phase of a three-phase source 158. A magnetic pickup structure 160 and 162 respectively are positioned beneath the scanners 152 and 154. Each of these structures include an induction coil 164 and 166 respectively. In this embodiment, one leg of the magnetic pickup loop extends longitudinally of the meter ribbon 148 whereas in the embodiment illustrated in FIGURES 11 through 15, the leg b extends transversely of the meter ribbon. The magnetic flux modulating action of the scanners 152 and 154 is, however, similar to the action of the scanners 102, 110 and 112. They serve to modulate flux at a predetermined frequency corresponding to the rate of scanning and thus induce a cyclic signal in the coils 164 and 166. As is the case with the previously described embodiments, relative bodily movement between the meter ribbon and the scanners produces a phase change proportional to the amount of such relative movement.

The scanner 154 has threads formed thereon at a pitch equal to the pitch of the areas 150. The scanner 152 is, however, a ten-start screw, that is to say, the threads of this scanner are formed at a multiple of the pitch of the area 150 so that during one revolution of the scanner 152, ten times as many threads will scan the area 150 as is the case with the scanner 154. Thus if these two scanners 152 and 154 are rotated at the same speed, the scanner 154 will modulate flux at the frequency corresponding to the rate of rotation whereas the scanner 152 will generate a signal at ten times that frequency.

The signal from the scanner 154 is amplified as at 168 and supplied to the rotor windings of a resolver 170. The stator windings of the resolver 170 are suppleid from the three-phase source 158. The rotor 172 of the resolver carries an indicating drum 174 which is calibrated in hundredths and thousandths of inches. As long as the signal from the scanner 154 and supplied to the rotor windings is at the same frequency as the signal supplied from the three-phase source 158, the rotor 172 will be stationary. However, when the scanner and meter bar 148 undergo relative bodily movement so as to bring about a phase change, the rotor 172 will rotate through a predetermined number of electrical degrees corresponding to the phase change. If, for example, the amount of relative movement is .05 inch or one-half of a pitch, the signal generated from the scanner 154 will undergo a 180 degree phase change and this will cause rotation of the resolver rotor 172 through 180 degrees to present the .050 reading on the drum until the two signals are again in phase.

The signal from the scanner 152 has a frequency of ten times the frequency of the scanner 154. An electronic dividing circuit diagrammatically illustrated at 176 is used to divide this frequency by 10. The resulting signal is amplified as at 178 and supplied to a phase summing circuit 180. A second resolver 182 has its stator windings energized from the three-phase source 158 and has its rotor coupled to an indicating drum 184 which reads in tenths of inches. The single phase rotor windings supply a signal induced therein by the stator windings to the summing circuit 180. The summing circuit serves to compare the phase relations of the signal supplied from the amplifier 178 and the signal supplied from the rotor windings of the resolver 182. It may compare the phase relations by thyratron tubes in a well known manner and supply a D.C. output signal to a D.C. motor 186. The D.C. motor 186 is geared to the rotor shaft 188. When the signal supplied to the adding circuit are in phase, there is no D.C. output signal. When they are out of phase, however, a D.C. output signal results and this energizes the motor 186 to rotate the rotor of the resolver 182 and the drum 184. If these signals are out of phase by 180 electrical degrees, the rotor of the resolver 182 will be revolved through 180 degrees. If they are out of phase by a lesser amount or greater amount, the rotor will be revolved through a lesser amount or greater amount.

A mechanical counter is designated at 190 and has a window 192 for presenting a reading of the number of revolutions of the rotor 188 up to 1000. Since one revolution of the rotor 188 and drum 184 are equivalent to one inch, the counter 190 may present a reading of the displacement in terms of the number of inches making up the displacement.

It should be noted that the combined action of the ten-start scanner 152 and dividing circuit 176 serve to divide the amount of the phase displacement by 10. For example, if the scanning rate is 60 revolutions per second, the signal generated from the scanner 154 will be 60 cycles per second while the signal generated by the scanner 152 will be 600 cycles per second. A linear displacement of the meter ribbon 148 through a distance equal to one pitch or one tenth of an inch will bring about a momentary frequency of either 59 cycles per second or 61 cycles per second in the signal generated from the scanner 154 depending upon the direction of scanning and the direction of movement of the meter bar 148 and the direction of scanning. This same movement will bring about a momentary frequency of either 599 cycles per second or 601 cycles per second in the signal generated from the scanner 152. After division by the electronic dividing circuit 176, the signal will be either 59.9 cycles per second or 60.1 cycles per second. Thus the signal supplied to the adding circuit 180 will have the same base frequency as the frequency of the three-phase source and the frequency of the rotor windings of the resolve 182 but a predetermined displacment of th meter bar 148 brings about a phase change in the signal supplied from the amplifier 178 which is a submultiple of the corresponding phase change in the signal supplied from the amplifier 168. In this embodiment, therefore, I employ two scanners and a single series of spaced magnetic flux transmissive or emissive areas, but I employ two scanners each of which has a series of flux conductive or flux transmissive or flux emitting areas thereon spaced in accordance with the spacing of the magnetic areas on the member 148. One series of the scanning members is, however, formed at a pitch corresponding to a multiple of the pitch of the other. The result is a reading of the displacement in terms of multiples and submultiples of units of linear measurement.

Figure 11:
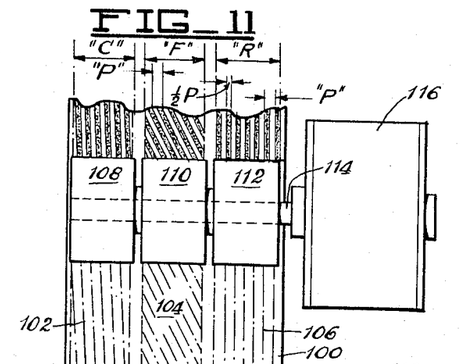
FIGURE 11 is a plan view of another embodiment of the invention.
Figure 12:
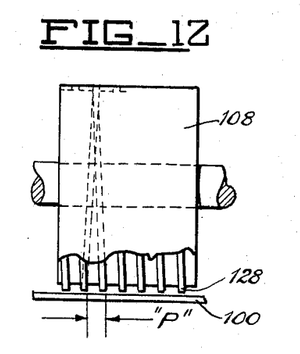
FIGURE 12 is a detail view of one of the elements of FIGURE 11.
Figures 18, 19, 20, 21:
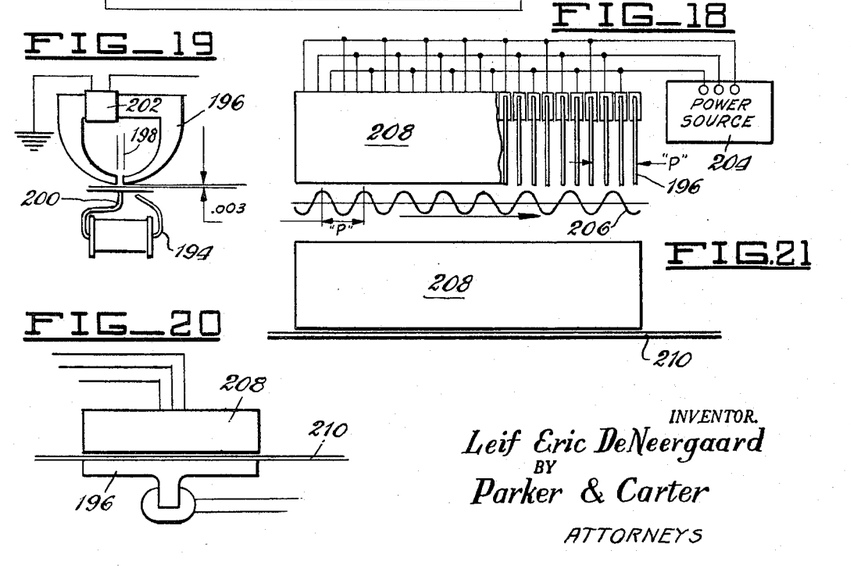
FIGURE 18 illustrates another embodiment of the invention.
FIGURE 19 illustrates an end elevation of the device shown in FIGURE 18.
FIGURE 20 is a side view illustrating the embodiment of FIGURES 18 and 19.
FIGURE 21 is another view illustrating the embodiment of FIGURE 18.

FIGURES 18, 19, 20 and 21 illustrate a modified form of scanner which may be employed with the embodiment of FIGURE 11 or the embodiments of FIGURES 1 and 16. In these figures, a magnetic pickup circuit is designated at 194 in FIGURE 19. This pickup is similar to the pickup illustrated in FIGURE 14 and is used with a meter ribbon similar to those shown in FIGURE 11 or 16. The scanning action in this embodiment is, however, attained by a plurality of equally spaced and stationary magnetic transmitting or emissive elements 196. Each of the elements 196 has legs which terminate in a gap 198 immediately above the leg 200 of the pickup. Each of the elements 196 has an induction coil 202 formed thereabout. The spacing of these elements is such that there are three elements per pitch of the areas 150 in FIGURE 16. Adjacent elements are supplied with a different phase of a three-phase source 204. The magnetic flux established across the gap 198 varies in a cyclic manner corresponding to the frequency of the source 204. Since adjacent elements are out of phase with one another by 120 degrees, the maximum regulating effect of the elements will move across the area positioned adjacent the elements in a cyclic manner and in a manner similar to the movement of the threads of the rotatable scanner 154. The effect produced is that of a magnetic regulatory field which moves transversely across the areas as is diagrammatically represented by the curve 206 in FIGURE 18. The elements 196 may be enclosed in any suitable nonconductive material as is designated at 208 in FIGURE 21 and positioned over a meter bar 210. In FIGURE 20 is will be noted that the magnetic pickup 196 extends along the length of the meter bar 210 although it can extend transversely if used with the form of the invention in FIGURE 11. As the point of maximum regulating effect moves transversely across the areas it varies, sinusoidally, the flux to the coil 194 and thus induces a cyclic signal in the coil. Movement of the areas with respect to the elements brings about the phase change.

Figure 22:
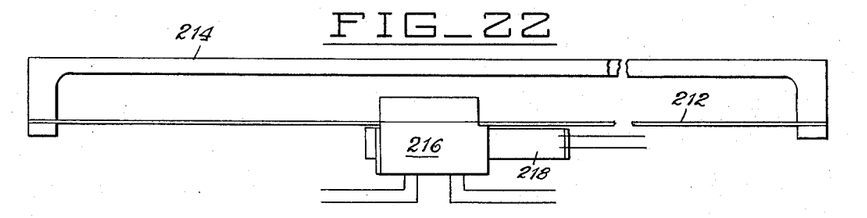
FIGURE 22 is a diagrammatic view illustrating a manner of use of the system shown in the preceding figures.
Figure 23:
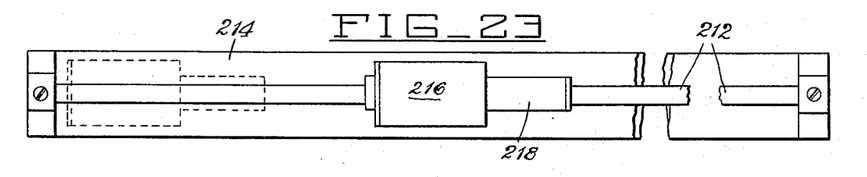
FIGURE 23 is a plan view of the system illustrated in FIGURE 22.

FIGURES 22 and 23 represent a manner of mounting the meter bars and scanning assemblies. The meter bar in this instance is shown as a flexible stainless steel magnetic storage member similar to the one employed in the embodiment of FIGURES 11 and 16. The meter bar 212 is pretensioned and held in generally a single plane by a rigid steel support 214. The ends of the member 212 may be clamped and held by the spaced legs of the support. A housing 216 may include the scanners driven by a motor 218 and supported by any suitable slideways (not shown) so that there is no physical contact between the scanners and the meter ribbon 212. Thus the housing and scanners may be moved from one end of the support 214 (indicated by the dotted lines in FIGURE 23) to the other and measure the amount of movement at any point along this path in terms of a proportional phase change in the signal generated.

Figure 24:
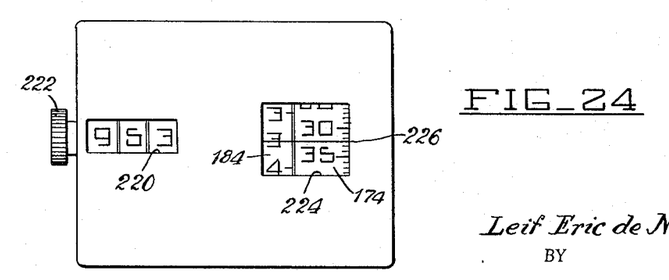
FIGURE 24 illustrates a typical indicating instrumentality employed with the system illustrated in FIGURE 17.

FIGURE 24 illustrates a housing for the indicator shown in FIGURE 17. The window 220 presents the displacement in terms of units, tenths and hundredths of inches of units. A counter reset knob is indicated at 222 for zeroing the indicator at any point in the length of the member 212. The drum 184 is alongside the drum 174 and a window 224 is provided with a cross-hair 226 for accurately reading the displacement indicated. The drum 184 presents a reading of the displacement in tenths and the drum 174 presents a reading in hundredths and thousandths of inches. The reading shown would be 953.333 inches.

It will be understood that the methods and means described and illustrated in the instant disclosure can be utilized in many different types of measuring devices such as inside and outside micrometers, depth micrometers, thread gauges, bench inspection gauges, height gauges, etc. It will also be understood that the systems herein disclosed are also suitable for measuring and visually indicating the linear movement of various measuring elements which are displaced in response to physical changes such as pressure, temperature, and density. Thus, as an example, changes in the length of a metallic bellows in response to changes in pressure of a gas could be very accurately measured and then visually indicated at a point remote from the bellow.

In the invention, the displacement being measured is, in effect, divided into a series of equal increments and each of these increments is related to a predetermined quantity of electrical degree phase shift of a cyclic signal. The phase shift in the cyclic signal is utilized to actuate a phase sensitive indicator which is calibrated in units of linear measurement.

The system provides a first measuring element which takes the form of an elongated meter bar which has a series of equally and lineally spaced magnetic flux areas spaced along the length thereof sitting up or establishing a uniform flux pattern. These areas are separated from one another by areas having different magnetic flux qualities and each of the flux transmissive areas is spaced from the adjacent flux transmissive areas by a predetermined unit of linear measurement. The other measuring element of the system takes the form of a scanning assembly or magnetic flux modulator which scans a plurality of the aforementioned flux transmissive areas at a predetermined rate and thereby generates a cyclic signal having a frequency corresponding to the scanning rate. The elongated meter bar and scanning assembly are mounted for relative movement with respect to one another. When these measuring elements move relative to one another, the signal generated by the assembly undergoes a phase shift proportional to the relative movement. The signal is supplied to a phase sensitive indicating instrument and the indicator presents a visual numerical representation of the number of quantities making up the total phase displacement and the number of units of linear measurement making up the displacement.

While the scanning means has been generally referred to as a helix herein, it should be understood that the word spiral might be applied as well. Also, the meter bar has been referred to as lineal or rectilinear or as lineally extending, both in the specification and claims. It should be understood that the meter bar might be in the form of a disc or record and, therefore, it might be circular or annular. Accordingly, it should be understood that the term "lineal" or the like should not be restrictively interpreted to mean only a rectilinear bar or line. For example, the areas 150 on the meter bar and 148 in FIGURE 16, might be considered to be on the peripheral surface of a disc or cylinder. Also, at numerous places in the specification and claims, I have referred to the areas as being either flux transmitting or flux emissive. And it should be understood that the magnetic flux may emit from the areas, which is the preferred form, or those areas may be merely transmissive or conductive for the flux. Again, the particular terms used should be interpreted to include either emitting flux or transmitting flux, since either interpretation is within the scope of the invention.

In the specification, principles of the invention and the best mode contemplated for applying those principles have been explained, so as to distinguish the invention from other inventions; and the part, improvement or combination which is claimed as the invention or discovery is particularly pointed out and distinctly claimed hereinafter.

While certain preferred embodiments of the invention have been shown and described, it will be understood that modifications and changes may be made without departing from the spirit and scope thereof, as will be clear to those skilled in the art.

What is claimed is:

1. A system for measuring distance including indicating member means calibrated in units of measurement, a signal generating assembly including a lineally extending member having a plurality of areas thereon forming a uniform magnetic flux pattern, magnetic flux modulating means adjacent said lineally extending member, a coil associated with said modulating means, said modulating means being rotatable relative to said lineally extending member for modulating the magnetic flux pattern at a predetermined rate to induce a signal of a predetermined frequency in said coil, relative lineal movement between said lineally extending member and modulating means representative of a distance being measured changing the phase of the modulated magnetic flux and the signal, said indicating member means being responsive to phase changes in the signal to present a representation of the distance in units of linear measurement.

2. The structure of claim 1 further characterized in that the modulating means includes at least one cylindrical rotor having a helical thread formation thereon.

3. The structure of claim 2 further characterized by and including means for rotating said cylindrical rotor at a generally constant speed.

4. The structure of claim 1 further characterized in that said lineally extending member has a series of spaced teeth positioned adjacent said magnetic flux modulating means.

5. The structure of claim 1 further characterized by and including means for establishing two magnetic flux circuits, one of said circuits being formed by said lineally extending member and said magnetic flux modulating means, the other magnetic flux circuit including said magnetic flux modulating means and being effective to generate a cyclical reference signal.

6. The structure of claim 5 further characterized by and including a second coil, said first-named coil being in said first magnetic flux circuit and said second coil being in said second magnetic circuit.

7. The structure of claim 1 further characterized in that the areas on said lineally extending member for establishing a uniform magnetic flux pattern extend in the direction of movement of said lineally extending member.

8. The structure of claim 7 further characterized in that the magnetic flux areas extending in the direction of movement of said lineally extending member are arranged in at least two groups, with one of said groups being used to generate a reference signal.

9. The structure of claim 8 further characterized in that displacement of the areas for establishing a uniform magnetic flux pattern, across the direction of movement of said lineally extending member, being effective to change the phase of the modulated magnetic flux.

10. The structure of claim 1 further characterized in that said indicating member means includes a stroboscopic light.

11. The structure of claim 10 further characterized in that said indicating member means includes a rotatable disc, calibrated in units of measurement and positioned with a portion thereof illuminated by said stroboscopic light.

12. The structure of claim 1 further characterized in that said magnetic flux modulating means provides two signals, each of a predetermined frequency, one of said signals indicating a fine distance measured, and the other signal indicating a coarse distance measured.

13. The structure of claim 1 further characterized in that the areas on said lineally extending member for establishing a uniform magnetic flux pattern extend across the direction of movement of said lineally extending member.

14. The structure of claim 13 further characterized in that said modulating means includes a pair of cylindrical rotors each having a helical thread formed thereon.

15. The structure of claim 1 further characterized in that said indicating member means includes an element having a rotatable electric coil.

16. A phase shifting signal generating means comprising an elongated and lineally extending meter bar having, throughout a major portion of its length, two series of areas with different magnetic flux characteristics for establishing a uniform magnetic flux pattern, the areas of said two series being positioned alternately along the length of the meter bar, at a pitch equal to a unit of lineal measurement, flux modulating means adjacent said meter bar, a coil associated with said flux modulating means, said flux modulating means being movable relative to the meter bar to modulate magnetic flux from at least two of said areas to induce an electric signal in said coil.

17. The structure of claim 16 further characterized in that said flux modulating means includes a cylindrical rotor having a helical thread formation thereon.

18. The structure of claim 16 further characterized by and including means for rotating said flux modulating means at a generally constant rate to induce a cyclic signal in said coil.

19. The structure of claim 18 further characterized in that relative lineal movement between said meter bar and flux modulating means changing the phase of the signal induced in the coil.

20. A method of visually indicating the magnitude of a distance, including the steps of establishing a uniform magnetic flux pattern from magnetic flux regulating areas lineally spaced in equal increments related to a predetermined quantity of measurement, periodically varying the flux from at least two of the flux areas at a generally constant rate to generate a cyclic signal, moving the flux regulating areas a distance representative of the distance being measured to thereby vary the phase of the cyclic signal, and utilizing the variation in the phase of the signal to present a visual representation of the distance being measured.

21. A method of measuring a linear displacement including the steps of positioning two series of equally spaced, cooperating, magnetic flux sensitive signal generating elements along parallel and lineally extending axes, utilizing one series to continuusly modulate the magnetic flux from the other series at a predetermined rate, and producing relative movement between the elements by an amount equal to a displacement being measured to thereby vary the phase of the modulated flux whereby the displacement may be represented in terms of the quantity of electrical degree phase variance in the magnetic flux.

22. An electromechanical transducer comprising a first member of cylindrical form having around its cylindrical surface a first helical path of material having a different magnetic characteristic than the magnetic characteristic of the material from which said first member is formed, a second member at least partially surrounding the cylindrical surface of said first member and in close proximity thereto, with at least one portion of said second member having at least a portion of a second helical path and of material having a different magnetic characteristic than the magnetic characteristic of the material from which said second member is formed, said second helical path having substantially the same pitch as said first helical path, and a magnetic field providing member positioned to be operative with the magnetic surface including said second member having said second helical path, the gaps between said first and second members and at least a portion of said first member.

23. An electromechanical transducer comprising a first member of cylindrical form having around its cylindrical surface a first helical path of material having a different magnetic characteristic than the magnetic characteristic of the material from which said first member is formed, a second member at least partially surrounding the cylindrical surface of said first member and in close proximity thereto, with at least one portion of said second member having at least a portion of a second helical path and of material having a different magnetic characteristic than the magnet characteristic of the material from which said second member is formed, said second helical path having substantially the same pitch as said first helical path, and magnetic reluctance sensing means positioned to sense the magnetic characteristic of the magnetic circuit including another portion of said second member not including said second helical path and said one portion of said second member having said second helical path, the gaps between said first and second members and at least a portion of said first member, and with at least one of said first and second members being formed from ferromagnetic material.

24. An electromechanical transducer comprising a first member of cylindrical form having around its cylindrical surface a first helical path of material having a different magnetic characteristic than the magnetic characteristic of the material from which said first member is formed, a second member at least partially surrounding the cylindrical surface of said first member and in close proximity thereto, with at least one portion of said second member having at least a portion of a second helical path and of material having a different magnetic characteristic than the magnetic characteristic of the material from which said second member is formed, said second helical path having substantially the same pitch as said first helical path, and magnetic characteristic measurement means positioned to measure the magnetic characteristic of the magnetic circuit including another portion of said second member not including said second helical path and said one portion of said second member having said second helical path, the gaps between said first and second members and at least a portion of said first member, with at least one of said first and second members being formed from ferromagnetic material, and the material of at least one of said first and second helical paths being air.

25. An electromechanical transducer comprising a first member of cylindrical form having around its cylindrical surface a first helical path of material having a different magnetic characteristic than the magnetic characteristic of the material from which said first member is formed, a second member at least partially surrounding the cylindrical surface of said first member and in close proximity thereto, with at least one portion of said second member having at least a portion of a second helical path and of material having a different magnetic characteristic than the magnetic characteristic of the material from which said second member is formed, said second helical path having substantially the same pitch as said first helical path, and magnetic field providing means positioned to be operative with the magnetic circuit including another portion of said second member not including said second helical path and said one portion of said second member having said second helical path, the gaps between said first and second members and at least a portion of said first member.

26. An electromechanical transducer comprising a first member of cylindrical form having around its cylindrical surface a first helical path, a second member at least partially surrounding the cylindrical surface of said first member and in close proximity thereto, with at least one portion of said second member having at least a portion of a second helical path, said second helical path having substantially the same pitch as said first helical path, and magnetic reluctance sensing means positioned to sense the magnetic characteristic of the magnetic circuit including another portion of said second member not including said second helical path and said one portion of said second member having said second helical path, the gaps between said first and second members and at least a portion of said first member, and with at least one of said first and second members being formed from ferromagnetic material.

References Cited by the Examiner

UNITED STATES PATENTS

| | | | |
|---|---|---|---|
| 2,427,213 | 9/1947 | Jewell | 340—198 |
| 2,614,164 | 10/1952 | Huston | 340—199 |
| 2,628,539 | 2/1953 | Neergaard | 340—195 |
| 2,769,969 | 11/1956 | Comstock | 340—196 |
| 2,784,397 | 3/1957 | Branson | 340—190 |
| 2,800,384 | 7/1957 | Parker | 179—100.2 |
| 2,882,516 | 4/1959 | Neergaard | 340—195 |
| 2,891,115 | 6/1959 | Hogan | 340—174.1 |

FOREIGN PATENTS 1,074,892  10/1954  France.

NEIL C. READ, *Primary Examiner.*

THOMAS B. HABECKER, *Examiner.*